United States Patent
Kado

(10) Patent No.: US 12,267,474 B2
(45) Date of Patent: Apr. 1, 2025

(54) INFORMATION PROCESSING APPARATUS AND METHOD FOR NOTIFYING A USER AT AN APPROPRIATE TIMING THAT A CALIBRATION IS REQUIRED

(71) Applicant: CANON KABUSHIKI KAISHA, Tokyo (JP)

(72) Inventor: Kazuki Kado, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/049,201

(22) Filed: Oct. 24, 2022

(65) Prior Publication Data

US 2023/0138284 A1 May 4, 2023

(30) Foreign Application Priority Data

Oct. 28, 2021 (JP) .................. 2021-176372

(51) Int. Cl.
*H04N 1/60* (2006.01)
*G03G 15/00* (2006.01)

(52) U.S. Cl.
CPC ....... *H04N 1/6027* (2013.01); *G03G 15/5016* (2013.01); *G03G 15/55* (2013.01)

(58) Field of Classification Search
CPC ... H04N 1/6027; G03G 15/55; G03G 15/5016
See application file for complete search history.

(56) References Cited

U.S. PATENT DOCUMENTS

| | | | | |
|---|---|---|---|---|
| 2002/0171681 A1* | 11/2002 | Nomura | ............... | G03G 15/502 715/772 |
| 2006/0171724 A1* | 8/2006 | Yamanaka | ......... | G03G 15/5079 399/24 |
| 2007/0053701 A1* | 3/2007 | Nagata | ................... | G03G 15/55 399/24 |
| 2007/0285743 A1* | 12/2007 | Hirayama | ............ | H04N 1/6033 358/1.9 |

FOREIGN PATENT DOCUMENTS

JP    2007329929 A    12/2007

* cited by examiner

*Primary Examiner* — Carla J Therrien
(74) *Attorney, Agent, or Firm* — Canon U.S.A., Inc. IP Division

(57) ABSTRACT

An information processing apparatus includes an obtaining unit configured to obtain information about a drum unit from an image forming apparatus configured to form an image on a sheet using the drum unit, and a notification unit configured to provide a notification, in a case where it is detected that the drum unit has been replaced with a new one based on the information obtained by the obtaining unit, indicating that a calibration is required.

17 Claims, 14 Drawing Sheets

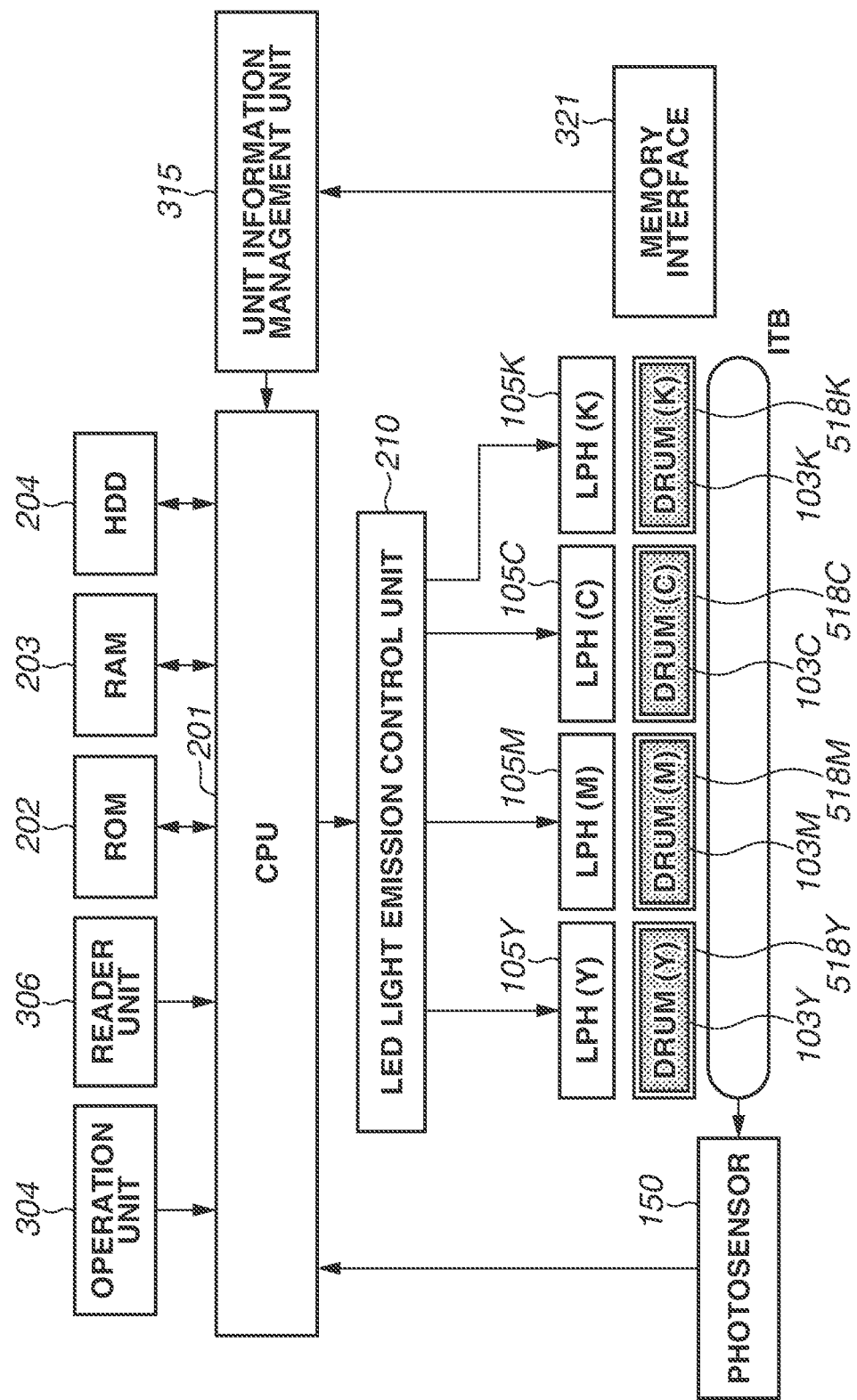

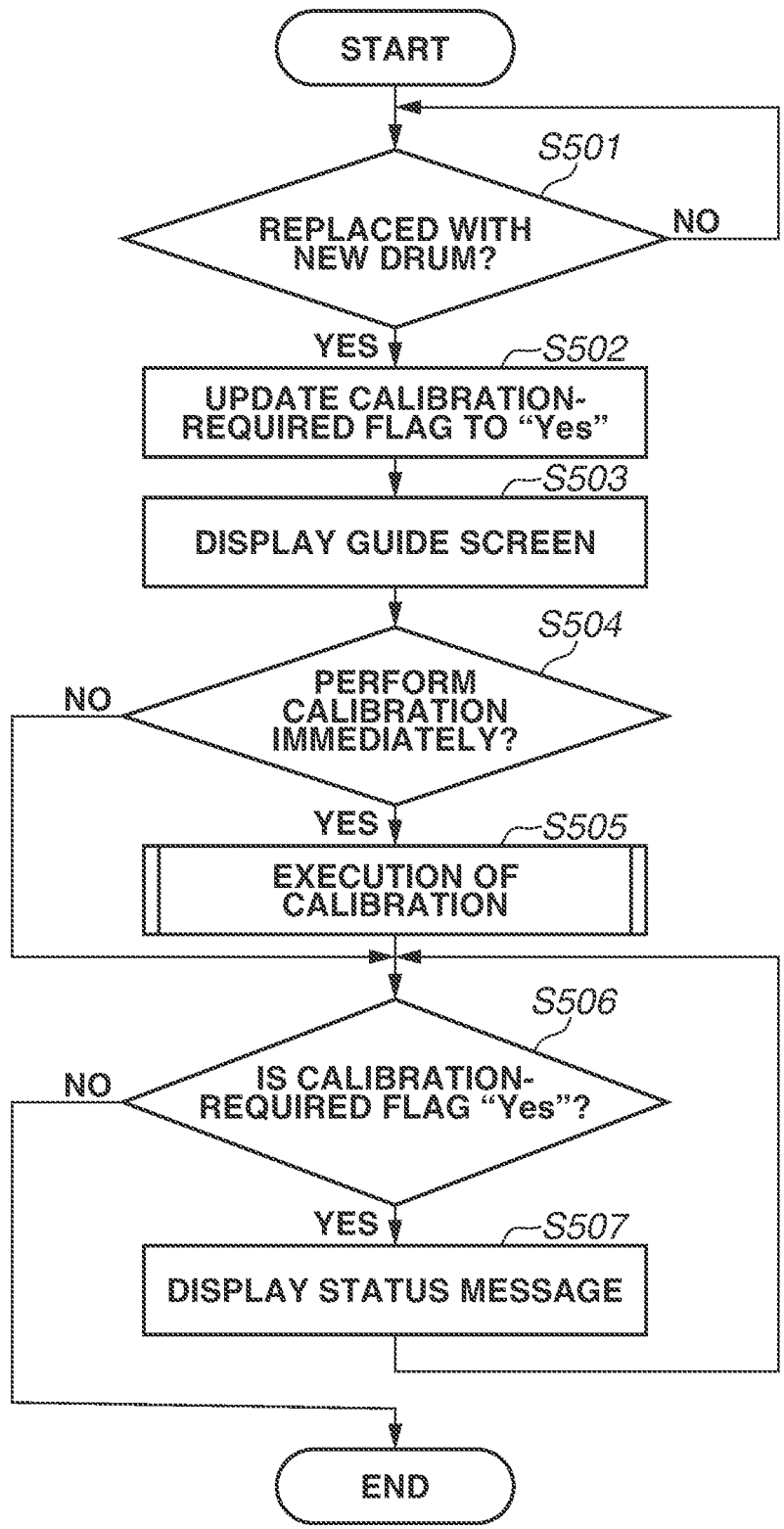

FIG.9A

901 — Setting/Registration

< Automatic Gradation Correction >
Select a correction type.

Full Correction     Quick Correction

905 — Cancel        OK

FIG.9B

901 — Setting/Registration

< Automatic Gradation Correction >
Select a cassete in which the type of sheet to be corrected is set.

· Selected Sheet
  A4
  Plain Paper 1 (64 - 75 g/m$^2$)

Manual Feed A4
A4
A3

905 — Cancel        OK

| FLAG NAME | FLAG |
|---|---|
| 1301 — DRUM REPLACEMENT REQUIRED_C | Yes |
| 1302 — DRUM REPLACEMENT REQUIRED_M | No |
| 1303 — DRUM REPLACEMENT REQUIRED_Y | No |
| 1304 — DRUM REPLACEMENT REQUIRED_K | No |
| 601 — CALIBRATION-REQUIRED | No |

FIG.13B

| FLAG NAME | FLAG |
|---|---|
| 1301 — DRUM REPLACEMENT REQUIRED_C | No |
| 1302 — DRUM REPLACEMENT REQUIRED_M | No |
| 1303 — DRUM REPLACEMENT REQUIRED_Y | No |
| 1304 — DRUM REPLACEMENT REQUIRED_K | No |
| 601 — CALIBRATION-REQUIRED | Yes |

FIG.13C

| FLAG NAME | FLAG |
|---|---|
| 1301 — DRUM REPLACEMENT REQUIRED_C | Yes |
| 1302 — DRUM REPLACEMENT REQUIRED_M | Yes |
| 1303 — DRUM REPLACEMENT REQUIRED_Y | No |
| 1304 — DRUM REPLACEMENT REQUIRED_K | No |
| 601 — CALIBRATION-REQUIRED | No |

FIG.13D

| FLAG NAME | FLAG |
|---|---|
| 1301 — DRUM REPLACEMENT REQUIRED_C | No |
| 1302 — DRUM REPLACEMENT REQUIRED_M | Yes |
| 1303 — DRUM REPLACEMENT REQUIRED_Y | No |
| 1304 — DRUM REPLACEMENT REQUIRED_K | No |
| 601 — CALIBRATION-REQUIRED | Yes |

INFORMATION PROCESSING APPARATUS AND METHOD FOR NOTIFYING A USER AT AN APPROPRIATE TIMING THAT A CALIBRATION IS REQUIRED

BACKGROUND

Field of the Disclosure

The present disclosure relates to an information processing apparatus, a method, and a storage medium.

Description of the Related Art

In multi-functional peripherals (MFPs), the density, the gradation characteristic, and the like of output images may vary due to an environmental variation such as a temperature variation and a humidity variation. In order to obtain a stable density and gradation characteristic of the output images, calibration is performed. In the calibration, a calibration pattern corresponding to an incorporated pattern is printed out, the printed calibration pattern is placed on a document positioning plate and read, and a correction to achieve a target density and a target gradation characteristic is reflected on the output images.

Japanese Patent Application Laid-open No. 2007-329929 discusses an image forming apparatus that performs calibration processing in a plurality of modes. Japanese Patent Application Laid-open No. 2007-329929 describes displaying a recommendation screen, when toner has been replaced for recommending a user to perform a calibration, and displaying a screen for prompting a user to perform a calibration, in a case where a calibration is not performed during a predetermined period set in advance or a period designated by a user.

In a case where the recommendation screen is displayed at the time of toner replacement as in Japanese Patent Application Laid-open No. 2007-329929, if a calibration is not performed at that timing, there is a possibility that the user cannot recognize thereafter that a calibration is required. In the technique discussed in Japanese Patent Application Laid-open No. 2007-329929, in a case where a calibration has not been performed during the predetermined period set in advance or the period designated by the user, the screen prompting a user for a calibration is displayed, but the user may not recognize that a calibration is required after the period ends.

SUMMARY

The present disclosure, at least, provides a technique capable of notifying a user at an appropriate timing that a calibration is required.

According to an aspect of the present disclosure, an information processing apparatus includes an obtaining unit configured to obtain information about a drum unit from an image forming apparatus configured to form an image on a sheet using the drum unit, and a notification unit configured to provide a notification, in a case where it is detected that the drum unit has been replaced with a new one based on the information obtained by the obtaining unit, indicating that a calibration is required.

Further features of the present disclosure will become apparent from the following description of exemplary embodiments with reference to the attached drawings.

BRIEF DESCRIPTION OF THE DRAWINGS

FIG. 2 is a block diagram illustrating a configuration of a control system of the image forming apparatus according to the exemplary embodiment.

FIG. 5 is a flowchart illustrating processing performed by the image forming apparatus according to the exemplary embodiment.

FIGS. 9A, 9B, and 9C are diagrams illustrating examples of calibration operation screens.

FIGS. 13A to 13D are diagrams illustrating flag management tables.

DESCRIPTION OF THE EMBODIMENTS

Hereinbelow, exemplary embodiments of the present disclosure will be described with reference to the attached drawings.

<Configuration of Image Forming Apparatus>

Figure 1:
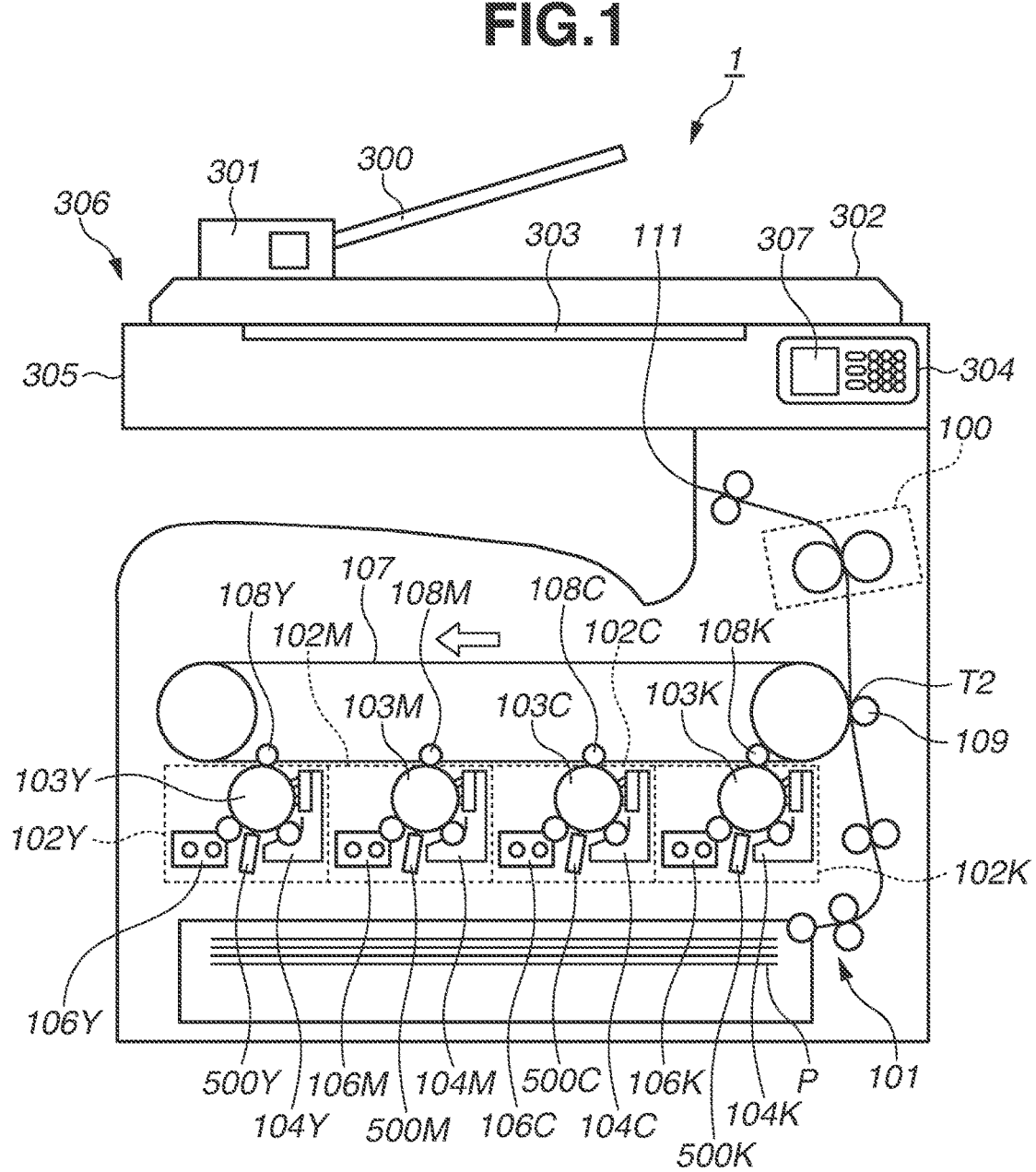
FIG. 1 is a cross-section diagram schematically illustrating a configuration of an image forming apparatus according to an exemplary embodiment.

FIG. 1 is a cross-section diagram schematically illustrating a configuration of an image forming apparatus 1 according to an exemplary embodiment. The image forming apparatus 1 according to the present exemplary embodiment is a tandem type color multi-functional peripheral (MFP).

As illustrated in FIG. 1, the image forming apparatus 1 includes a reader unit 306 serving as a reading device. The reader unit 306 includes a document conveyance device 301 for conveying a document automatically, a document reading device 305 for reading an image of the conveyed document, and a document discharge tray 302 onto which the document is discharged.

The document conveyance device 301 includes a document feeding tray 300 on which documents are set, and conveys the documents placed on the document feeding tray 300 to a document reading position on a platen glass 303, one by one. The document conveyed onto the platen glass 303 is read by the document reading device 305. Then, the document conveyance device 301 conveys the document and discharge the document onto the document discharge tray 302.

The document reading device 305 includes a scanner and a full-color charge-coupled device (CCD) sensor (not illustrated).

The scanner performs exposure scanning of the document conveyed onto the platen glass 303 by the document conveyance device 301. The CCD sensor converts light reflected by the document due to the exposure by the scanner, into an electrical signal. When the scanner performs the exposure scanning of the document, the CCD sensor performs photoelectric conversion. In this way, the electrical signal expressing an image including red (R), green (G), and blue (B) components is transmitted to a central processing unit (CPU) 201 (refer to FIG. 2).

Further, as illustrated in FIG. 1, the image forming apparatus 1 includes an operation unit 304. The operation unit 304 includes a display 307 for displaying setting information of print conditions and other information to a user. The display 307 displays a status message for providing a notification indicating that a calibration is required, and a guide screen for providing the notification indicating that a calibration is required and accepting a calibration execution instruction. The details thereof will be described below.

The display 307 can display a software key that can be operated by being touched by the user. In this way, the user can input instruction information, such as one-sided printing or two-sided printing, via an operation panel. The operation unit 304 includes a start key to be pressed to start an image forming operation, and a stop key to be pressed to interrupt the image forming operation. A numeric keypad includes keys to be pressed to set numbers. In addition, the start key, the stop key, and the numeric keypad may be software keys displayed on the display 307, not hardware keys. Various kinds of data input via the operation unit 304 are stored in a random access memory (RAM) 203 through the CPU 201 (refer to FIG. 2).

The configuration of the image forming apparatus 1 will be described in more detail. As illustrated in FIG. 1, the image forming apparatus 1 includes four image forming units 102Y, 102M, 102C, and 102K for respectively forming toner patterns of yellow (Y), magenta (M), cyan (C), and black (K).

The image forming unit 102Y, 102M, 102C, and 102K include photosensitive drums 103Y, 103M, 103C, and 103K (hereinbelow, also collectively referred to simply as a photosensitive drum 103 or photosensitive drums 103), respectively. Further, the image forming unit 102Y, 102M, 102C, and 102K include charging units 104Y, 104M, 104C, and 104K (hereinbelow, also collectively referred to simply as a charging unit 104 or charging units 104) for charging the photosensitive drums 103Y, 103M, 103C, and 103K, respectively.

Further, the image forming unit 102Y, 102M, 102C, and 102K include light emitting diode (LED) exposure units 500Y, 500M, 500C, and 500K serving as exposure sources for emitting light beams to the photosensitive drums 103Y, 103M, 103C, and 103K to be exposed thereto, respectively. Further, the image forming units 102Y, 102M, 102C, and 102K include developing devices 106Y, 106M, 106C, and 106K (hereinbelow, also collectively referred to simply as a developing device 106 or developing devices 106) for developing toner patterns of different colors on the photosensitive drums 103, respectively. In addition, the image forming apparatus 1 illustrated in FIG. 1 employs a "bottom side exposure method" to expose each of the photosensitive drums 103 to light from a bottom side thereof. Hereinbelow, while a description is given of an image forming apparatus that employs the "bottom side exposure method" as an example, an image forming apparatus that employs a "top side exposure method" to expose each of the photosensitive drums 103 to light from a top side may be used.

The image forming apparatus 1 includes an intermediate transfer belt 107 and primary transfer rollers 108Y, 108M, 108C, and 108K. Toner patterns formed on the photosensitive drums 103 are transferred onto the intermediate transfer belt 107. The primary transfer rollers 108Y, 108M, 108C, and 108K transfer the toner patterns formed on the photosensitive drums 103 sequentially onto the intermediate transfer belt 107. Further, the image forming apparatus 1 includes a secondary transfer roller 109 for transferring the toner patterns on the intermediate transfer belt 107 to a recording sheet P (also referred to as a recording paper or a sheet) conveyed from a sheet feeding unit 101, and a fixing unit 100 for fixing the secondarily transferred image onto the recording sheet P. In addition, while the image forming apparatus 1 includes the intermediate transfer belt 107 in the present exemplary embodiment, the image forming apparatus 1 may include an electrostatic transportation belt (ETB), instead of the intermediate transfer belt 107. The ETB is a belt that attracts a sheet (paper) to the belt using an electrostatic attraction force, conveys the sheet using a rotation of the belt, and transfers the toner patterns onto the conveyed sheet from the photosensitive drums 103.

Next, an image forming process will be described.

The exposure unit 500Y exposes the surface of the photosensitive drum 103Y charged by the charging unit 104Y to the light. In this way, an electrostatic latent image is formed on the photosensitive drum 103Y. Next, the developing device 106Y develops the electrostatic latent image formed on the photosensitive drum 103Y with yellow toner. The yellow toner pattern developed on the photosensitive drum 103Y is transferred by the primary transfer roller 108Y onto the intermediate transfer belt 107. The magenta, cyan, and black toner patterns are also transferred onto the intermediate transfer belt 107 in a similar image forming process.

The toner patterns of the four colors transferred onto the intermediate transfer belt 107 are conveyed by the intermediate transfer belt 107 to a secondary transfer portion T2. A transfer bias is applied to the secondary transfer roller 109 arranged at the secondary transfer portion T2 to transfer the toner patterns onto the recording sheet P. The toner patterns conveyed to the secondary transfer portion T2 is transferred, by applying the transfer bias of the secondary transfer roller 109, onto the recording sheet P conveyed from the sheet feeding unit 101. The recording sheet P with the toner patterns transferred thereon is conveyed to the fixing unit 100. The fixing unit 100 fixes the toner patterns onto the recording sheet P by applying heat and pressure. The recording sheet P on which the fixing processing is performed by the fixing unit 100 is discharged to a sheet discharge portion 111.

Next, with reference to FIG. 2, a configuration of a control system of the image forming apparatus 1 will be described. FIG. 2 is a block diagram illustrating the configuration of the control system of the image forming apparatus 1.

The CPU 201 is a control circuit configured to control each unit. A read-only memory (ROM) 202 stores a control program to be executed by the CPU 201 and required to control the driving of optical print heads 105Y, 105M, 105C, and 105K (hereinbelow, also collectively referred to simply as an optical print head 105 or optical print heads 105). The RAM 203 is a system work memory for the CPU 201 to operate. A hard disk drive (HDD) 204 stores image data transferred from the reader unit 306 or a personal computer (PC), and setting information and other information input via the operation unit 304.

An LED light emission control unit 210 corrects, under control of the CPU 201, image data by performing various kinds of image processing on the image data. Each of the color signals transmitted from the document reading device 305 to the CPU 201 is converted by the LED light emission control unit 210 into image data (dot data) of a corresponding color and input into the corresponding optical print head 105. The LED light emission control unit 210 not only performs the above-described data conversion, but also controls an amount of light emission and light emission timing of the LED included in each of the optical print heads 105. The LED light emission control unit 210 may be implemented by an integrated circuit such as an application specific integrated circuit (ASIC), or may be implemented by the CPU 201 executing a program stored in advance.

The image data corrected by the LED light emission control unit 210 is transferred to each of the optical print heads 105. Each of the optical print heads 105 is controlled based on the image data corrected by the LED light emission control unit 210. The optical print head 105Y exposes the photosensitive drum 103Y to light to form an electrostatic latent image on the photosensitive drum 103Y based on the image data. The same applies to other colors.

The toner patterns transferred onto the intermediate transfer belt 107 from the photosensitive drums 103 are detected by a photosensor 150.

Further, the photosensitive drums 103 for respective colors are unitized to configure drum units 518Y, 518M, 518C, and 518K (hereinbelow, also collectively referred to simply as a drum unit 518 or drum units 518), respectively. Each of the drum units 518 for respective colors is provided with a memory electrode 121 (refer to FIG. 4). The image forming apparatus 1 is provided with a memory interface 321 that contacts the memory electrode 121 to obtain information about each of the drum units 518. The information read by the memory interface 321 from the memory electrode 121 is transferred to a unit information management unit 315. The information obtained by the unit information management unit 315 is transferred to the CPU 201. In addition, while the unit information management unit 315 is illustrated to be a separate block from the CPU 201, the CPU 201 may function as the unit information management unit 315.

Figure 3A:
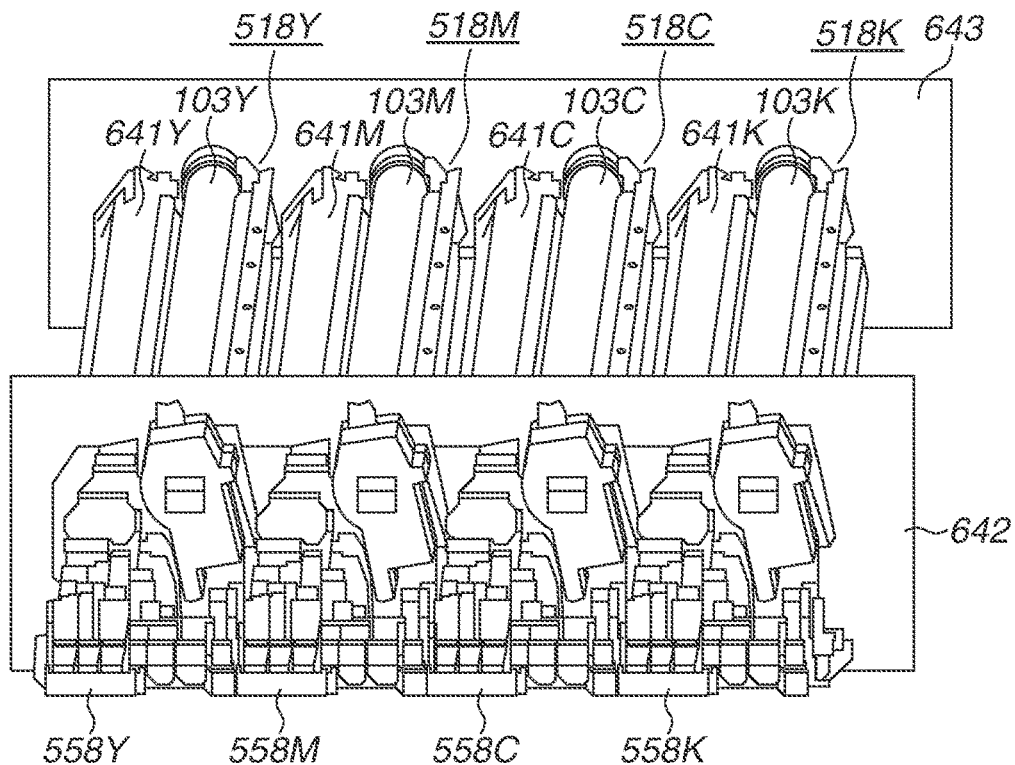
FIGS. 3A and 3B are diagrams illustrating a configuration around drum units.
Figure 3B:
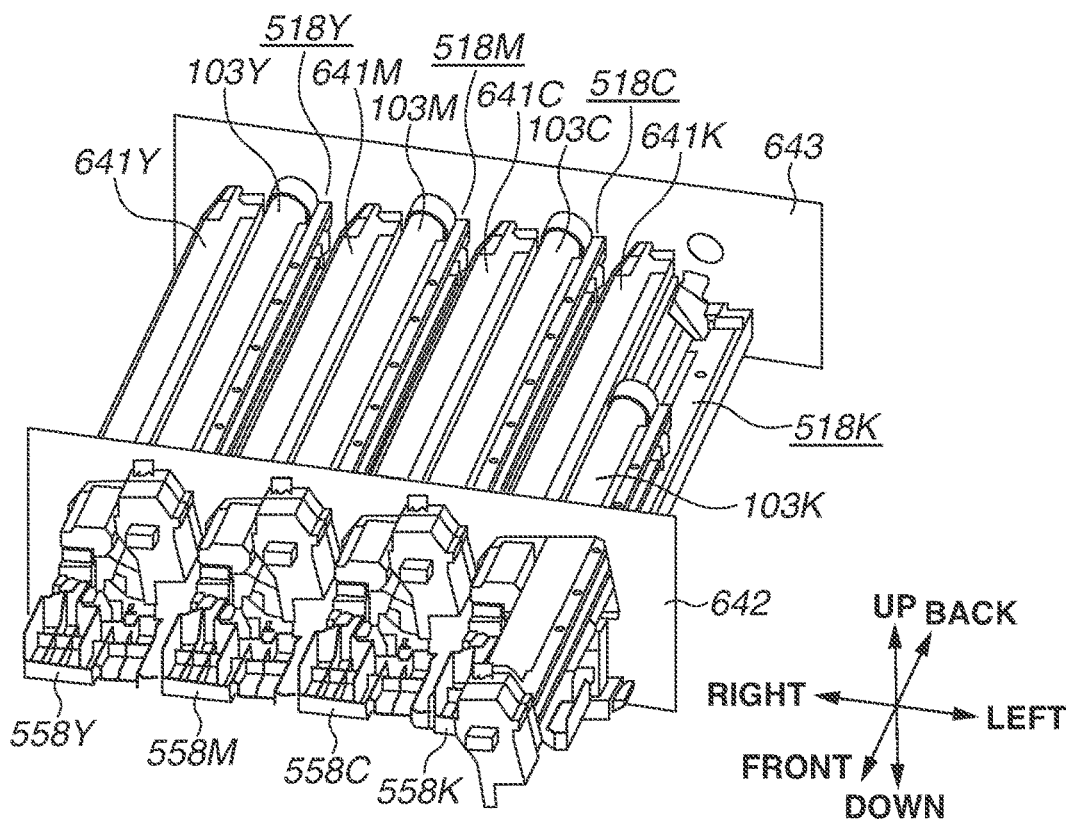

FIGS. 3A and 3B are diagrams illustrating a configuration around the drum units 518. FIG. 3A is a perspective view illustrating the configuration around the drum units 518 and development units 641. Further, FIG. 3B is a diagram illustrating a state where the drum units 518 are inserted in an apparatus main body of the image forming apparatus 1. In the following descriptions, the "front side" is defined as a side on which the drum unit 518 is put into and taken out from (inserted into/removed from) the apparatus main body of the image forming apparatus 1. Further, the "front side" is a side of the image forming apparatus 1 on which a user stands to operate the image forming apparatus 1. The "back side" (rear side) is a side opposite to the front side. In FIG. 3B, the defined directions are illustrated. In addition, a rotational axis direction of each of the photosensitive drums 103 is coincident with the front and back direction illustrated in FIG. 3B.

Each of the drum units 518 serving as a replaceable cartridge is mounted on the image forming apparatus 1. The user can replace each of the drum units 518 by inserting or removing each of the drum units 518 into or from the apparatus main body of the image forming apparatus 1 from the side surface thereof.

Each of the drum units 518 rotatably supports the corresponding photosensitive drum 103. More specifically, each of the photosensitive drums 103 is supported by a frame of the corresponding drum unit 518. However, each of the drum units 518 may not include the charging unit 104 and a cleaning device.

Further, the image forming apparatus 1 is mounted with the development units 641Y, 641M, 641C, and 641K (hereinbelow, also collectively referred to simply as a development unit 641 or development units 641) that are separately configured from the drum units 518. Each of the development units 641 is a cartridge in which the developing device 106 illustrated in FIG. 1 and a toner storage portion are integrated. Each of the developing devices 106 includes a development sleeve (not illustrated) for bearing developer. Each of the development units 641 is provided with a plurality of gears to rotate a screw for agitating toner and carrier. When these gears are deteriorated with age, a user removes the corresponding development unit 641 from the apparatus main body of the image forming apparatus 1 to replace it with a new one. In addition, the drum units 518 and the development units 641 may be integrated as a cartridge.

As illustrated in FIGS. 3A and 3B, the image forming apparatus 1 is provided with a front plate 642 and a rear plate 643, each formed of a sheet metal. The front plate 642 is a side wall provided on the front side of the image forming apparatus 1. The front plate 642 configures a part of a casing of the apparatus main body at the front side of the image forming apparatus 1. The rear plate 643 is a side wall provided on the back side of the image forming apparatus 1. The rear plate 643 configures a part of the casing of the apparatus main body at the back side of the image forming apparatus 1.

The front plate 642 and the rear plate 643 are arranged to face each other, and a metal plate (not illustrated) is bridged as a beam therebetween. The front plate 642, the rear plate 643, and the beam (not illustrated) configure a part of a frame of the image forming apparatus 1.

Openings are formed in the front plate 642 so that the drum units 518 and the development units 641 can be inserted into and removed through the openings from the front side of the image forming apparatus 1. The drum units 518 and the development units 641 are mounted at predetermined positions in the image forming apparatus 1 through the openings, respectively. Further, the image forming apparatus 1 is provided with covers 558Y, 558M, 558C, and 558K (hereinbelow, also collectively referred to simply as a cover 558 or covers 558) each of which covers the front side of the drum unit 518 and the front side of the development unit 641 mounted at the predetermined positions. Each of the covers 558 is fixed to the apparatus main body of the image forming apparatus 1 with a hinge at one end thereof to be rotatable by the hinge with respect to the image forming apparatus 1. The user opens any of the covers 558 to remove the corresponding drum unit 518 or the corresponding development unit 641, and inserts a new drum unit 518 or a new development unit 641, and then closes the cover 558. In this way, the replacement work is completed.

Figure 4:
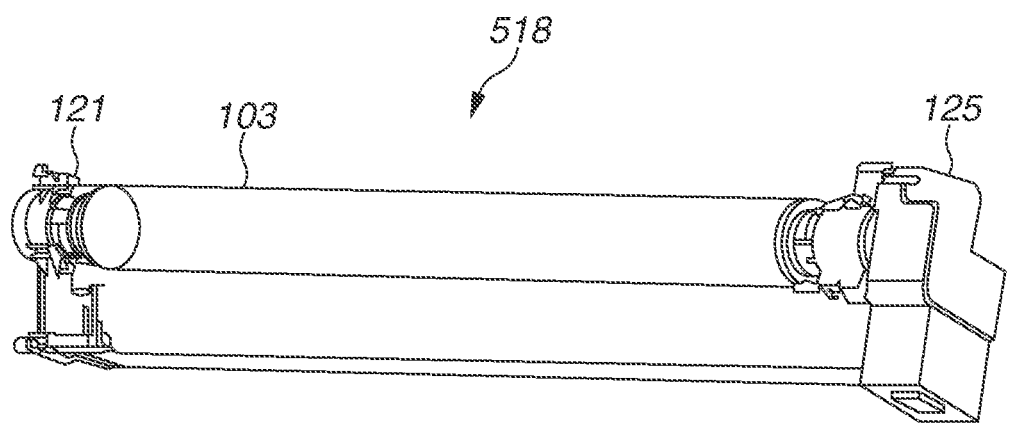
FIG. 4 is a perspective view of a drum unit.

FIG. 4 is a perspective view of one of the drum units 518. The configurations of the drum units 518 are substantially the same for respective colors. Thus, a description is given of one drum unit 518. As illustrated in FIG. 4, the drum unit 518 includes the photosensitive drum 103 and a frame 125 rotatably supporting the photosensitive drum 103. The frame 125 is positioned with respect to the apparatus main body of the image forming apparatus 1. The drum unit 518 can be mounted and removed by being inserted into and pulled out from the apparatus main body of the image forming apparatus 1 along the rotational axis direction of the photosensitive drum 103.

Further, as illustrated in FIG. 4, the frame 125 is provided with the memory electrode 121. The memory electrode 121 stores a serial number and information, for example, about the printable period, of the drum unit 518 with the memory electrode 121 provided thereto. The electrode terminal is made of metal, and information can be exchanged by bringing the electrode terminal into contact with the memory interface 321 provided on the image forming apparatus 1. Other examples of the memory electrode 121 include a radio frequency identification (RFID) tag, a bar code, and a quick response code (QR® code).

As described above, the memory electrode 121 is not limited to the contact type tag, and may be a non-contact type tag. The form of the memory electrode 121 is not limited as long as the identification information of the drum unit 518 can be written thereinto. A memory chip storing information about the drum unit 518 is built in the memory electrode 121, and exchange information with the memory interface 321 via the electrode terminal of the memory electrode 121. The type of the memory interface 321 may be simply determined based on the type of the memory electrode 121.

The image forming apparatus 1 is provided with the memory interface 321 as a unit to communicate with the memory electrode 121. In the present exemplary embodiment, the memory interface 321 also includes an electrode terminal. By the electrode terminal of the memory interface 321 contacting the electrode terminal of the memory electrode 121, the memory interface 321 obtains the information about the drum unit 518 from the memory electrode 121 via the electrode terminals. In a case where the drum unit 518 has been replaced, it is determined whether the drum unit 518 has been replaced with a new one by the memory interface 321 reading the memory electrode 121. In addition, the memory interface 321 or the CPU 201 may determine whether the drum unit 518 has been replaced with a new one.

Further, it is possible to determine whether the replacement of the drum unit 518 is required by storing the mount or the replacement detection date and time of the drum unit 518 in the RAM 203 via the CPU 201, and adding the remaining printable period read from the memory electrode 121.

In this case, the memory interface 321 is constantly detecting the contact when the memory interface 321 is in contact with the memory electrode 121. Thus, the CPU 201 recognizes that the drum unit 518 is removed from the image forming apparatus 1 in a case where the drum unit 518 is removed from the image forming apparatus 1 and the contact state between the memory electrode 121 and the memory interface 321 is released. Further, the memory interface 321 can also determine whether the drum unit 518 is in a mounted state on the image forming apparatus 1 by periodically reading the information of the memory electrode 121. In this way, the CPU 201 recognizes that the drum unit 518 has once been removed in the case where the drum unit 518 that is mounted on the image forming apparatus 1 is once removed and mounted again.

<Processing Performed by Image Forming Apparatus>

Hereinbelow, processing performed by the image forming apparatus 1 according to the present exemplary embodiment will be described. In the present exemplary embodiment, the image forming apparatus 1 functions as an information processing apparatus to which the present disclosure is applied.

FIG. 5 is a flowchart illustrating processing performed by the image forming apparatus 1. The flowchart in FIG. 5 is implemented by the CPU 201 executing a program stored in the ROM 202 or the HDD 204.

In step S501, the CPU 201 determines whether the drum unit 518 has been replaced with a new one. As described above, the CPU 201 can determine whether the drum unit 518 has been replaced with a new one by reading the memory electrode 121 by the memory interface 321. In step S501, in a case where the CPU 201 determines that the drum unit 518 has been replaced with a new one (YES in step S501), the processing proceeds to step S502. In this way, the CPU 201 determines whether the drum unit 518 has replaced with a new one by obtaining information about the drum unit 518 from the image forming apparatus 1.

In step S502, the CPU 201 updates a value of a calibration-required flag 601 to "Yes".

Figure 6A:
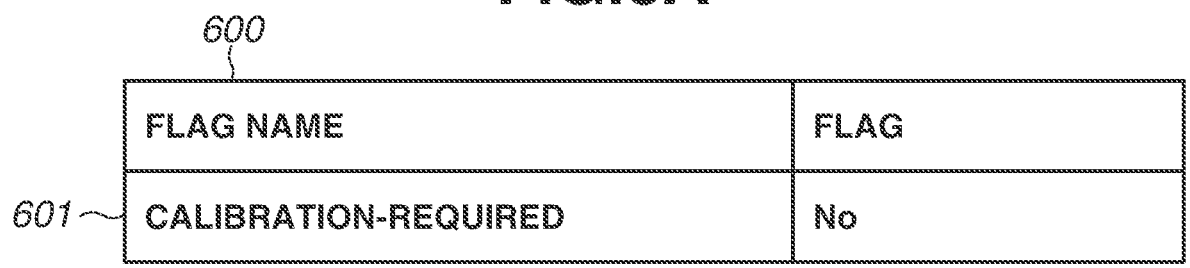
FIGS. 6A and 6B are diagrams illustrating a flag management table.
Figure 6B:
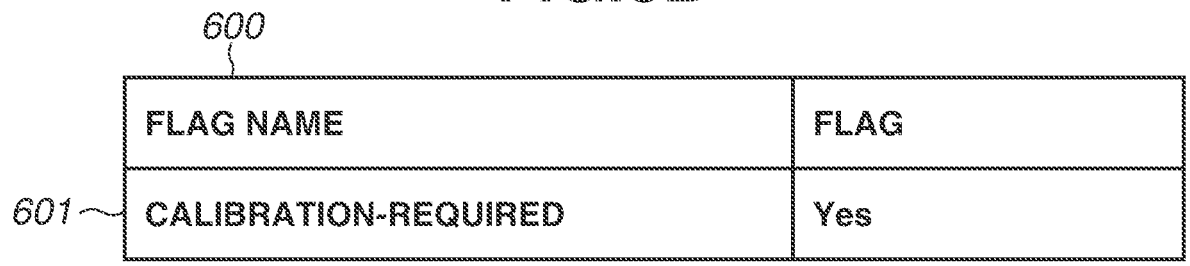

FIGS. 6A and 6B illustrate a flag management table 600 for managing the calibration-required flag 601 indicating whether a calibration is required. The calibration-required flag 601 corresponds to calibration information in the present exemplary embodiment. The flag management table 600 is stored in the ROM 202 or the HDD 204 and managed by the CPU 201. As illustrated in FIG. 6A, in a case where the calibration is not required, the value of the calibration-required flag 601 is "No" (not required). As illustrated in FIG. 6B, in a case where a calibration is required, the value of the calibration-required flag 601 is "Yes" (required). In the case where the CPU 201 determines that the drum unit 518 has been replaced with a new one in step S501, in step S502, as illustrated in FIG. 6B, the value of the calibration-required flag 601 is updated to "Yes".

Figure 7:
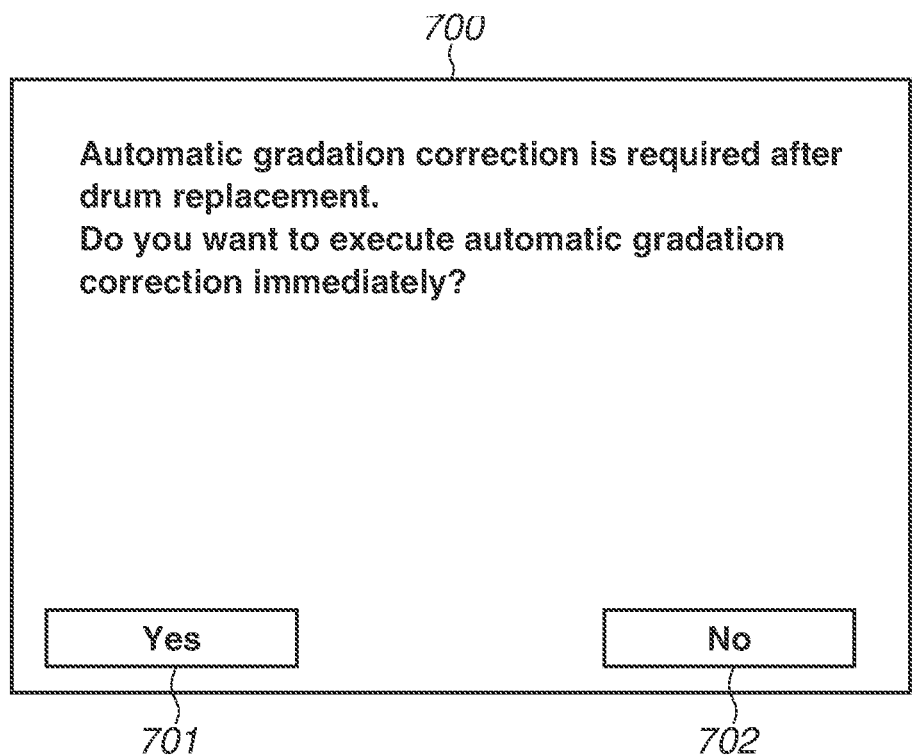
FIG. 7 is a diagram illustrating an example of a guide screen.

In step S503, as illustrated in FIG. 7, the CPU 201 displays on the display 307 a guide screen 700 for prompting the user to perform calibration. In this way, the CPU 201 notifies the user that the replacement of the drum unit 518 with a new one is detected and a calibration such as an automatic gradation correction is required as a result of the detection. On the guide screen 700, a "Yes" button 701 and a "No" button 702 are displayed to accept a calibration execution instruction. In this way, the CPU 201 prompts the user to perform calibration in response to the replacement of the drum unit 518 with a new one, as a trigger.

In step S504, the CPU 201 determines whether the calibration is to be performed immediately by accepting the input of the "Yes" button 701 or the "No" button 702 on the guide screen 700. In a case where the "Yes" button 701 is pressed (YES in step S504), the processing proceeds to step S505. In a case where the "No" button 702 is pressed (NO in step S504), the processing proceeds to step S506 skipping step S505.

In step S505, the CPU 201 executes a calibration execution sub-process.

Figure 8:
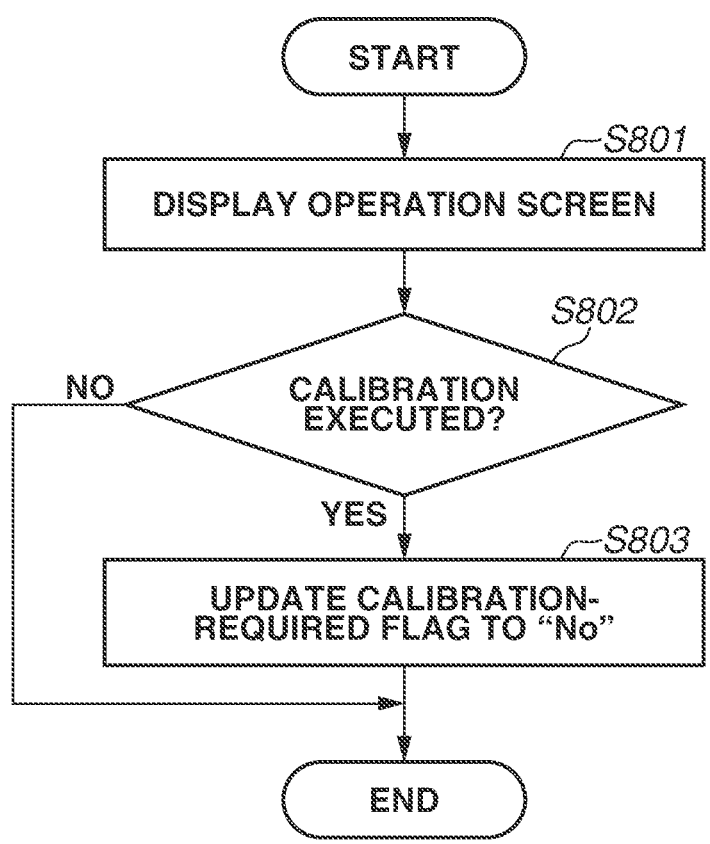
FIG. 8 is a flowchart illustrating a calibration execution sub-process.
Figure 9C:
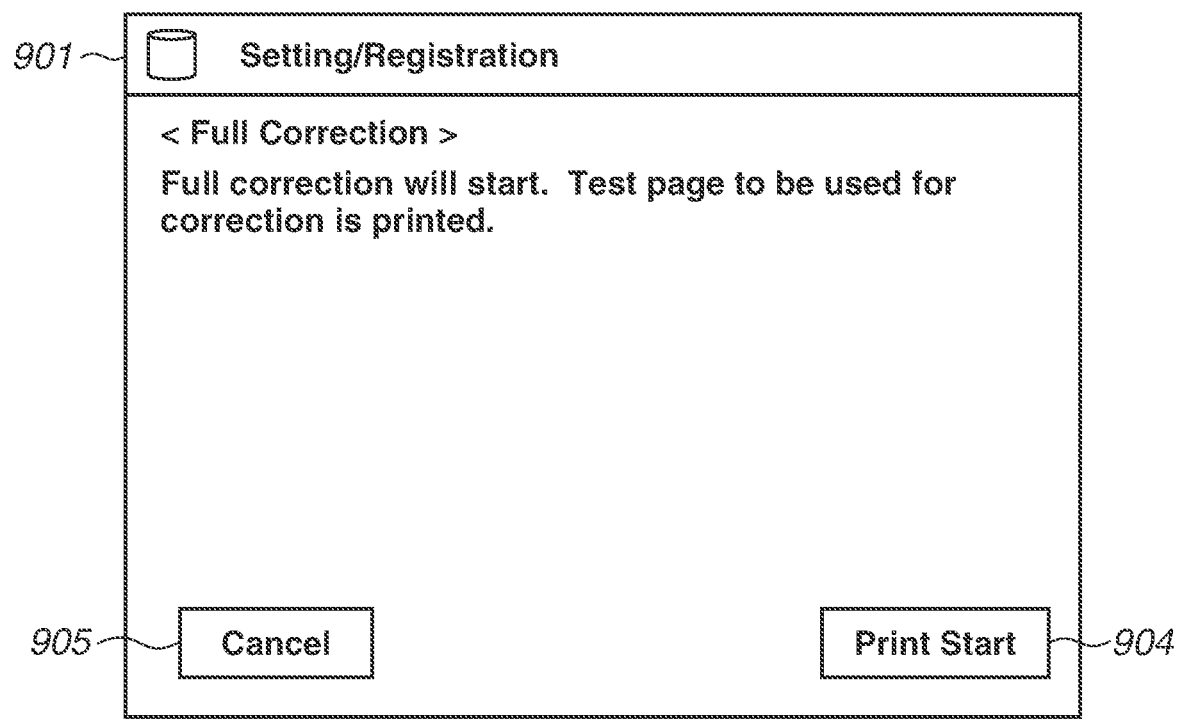

Now, with reference to FIGS. 8, 9A, 9B, and 9C, details of the calibration execution sub-process performed in step S505 will be described. FIG. 8 is a flowchart illustrating the calibration execution sub-process performed in step S505. FIGS. 9A, 9B, and 9C are diagrams each illustrating a calibration operation screen 901. The calibration operation screen 901 is typically a screen called manually by a user from a home screen or the like.

In step S801, the CPU 201 displays the calibration operation screen 901 on the display 307. The various settings and the user operations are required for the execution of the calibration. On the calibration operation screen 901, as illustrated in FIG. 9A, a type of the calibration can be selected, and, as illustrated in FIG. 9B, a sheet type of the correction target can be selected. Then, as illustrated in FIG. 9C, an instruction for printing a calibration pattern can be issued by pressing a print start button 904 on the calibration operation screen 901. On the calibration operation screen 901, a cancel button 905 is provided and the user can cancel the calibration operation at any time.

In step S802, the CPU 201 determines whether the calibration operation has been completed and the calibration has been executed. In a case where the calibration has been executed (YES in step S802), the processing proceeds to step S803. In a case where the calibration has not been executed (NO in step S802), the CPU 201 ends the calibration execution sub-process.

In step S803, the CPU 201 updates the value of the calibration-required flag 601 to "No", as illustrated in FIG. 6A, and ends the calibration execution sub-process. In addition, in step S802, in the case where the calibration has not been executed (NO in step S802), the value of the calibration-required flag 601 remains "Yes" as illustrated in FIG. 6B.

Referring back to FIG. 5, in step S506, the CPU 201 determines whether the value of the calibration-required flag 601 is "Yes". In a case where the value of the calibration-required flag 601 is "Yes" (YES in step S506), the processing proceeds to step S507. In a case where the value of the calibration-required flag 601 is "No" (NO in step S506), the CPU 201 exits the present flowchart. When the CPU 201 exits the present flowchart, in a case where a status message is displayed in a full-time display area 1001 in step S507 described next, the status message is caused to be not displayed.

Figure 10A:
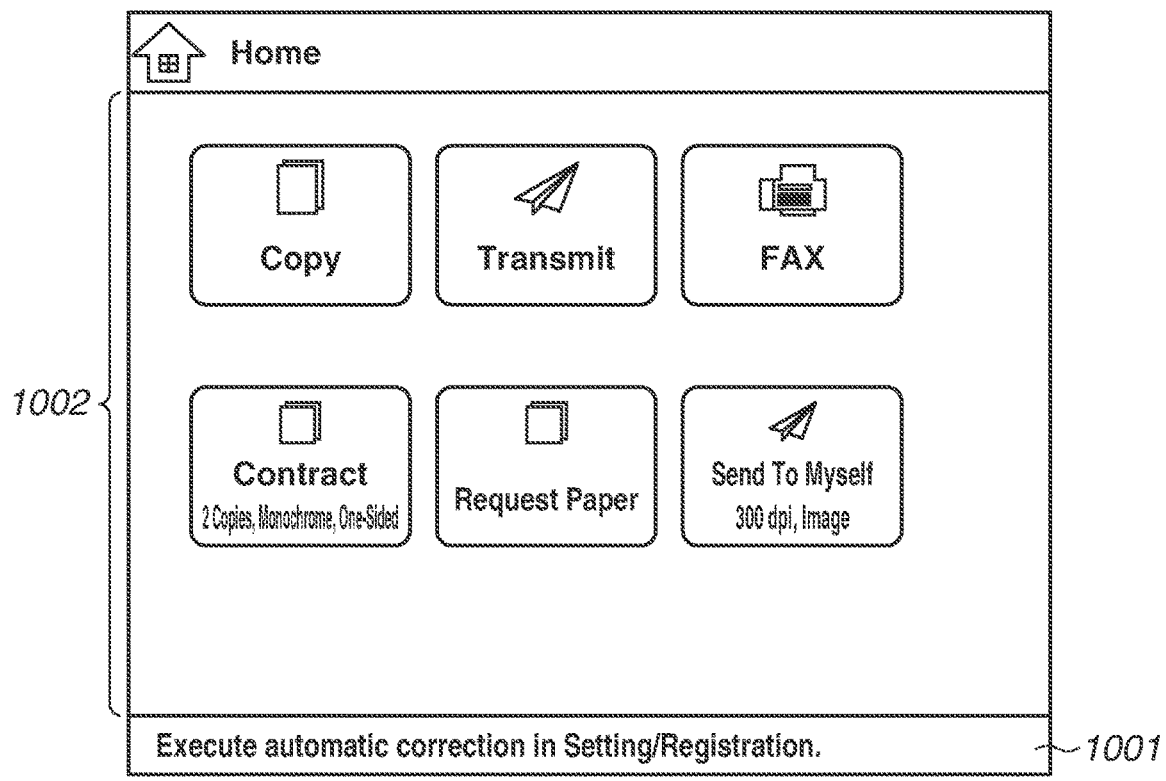
FIGS. 10A and 10B are diagrams illustrating examples of screens including a full-time display area.
Figure 10B:
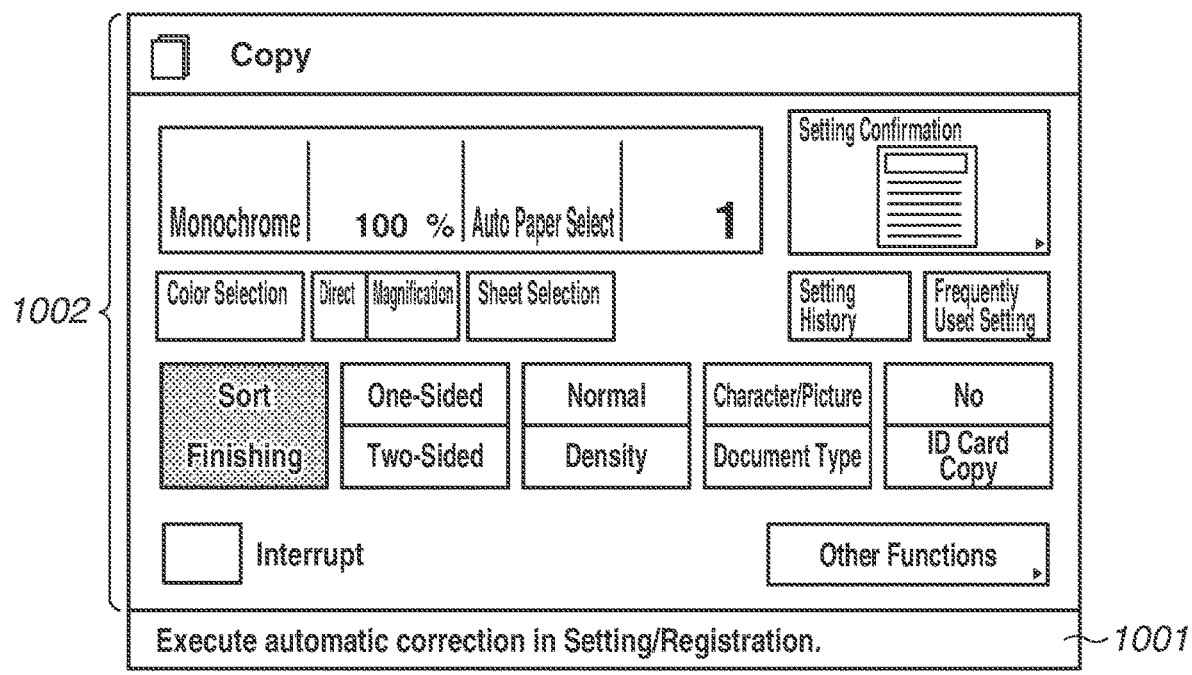

In step S507, the CPU 201 displays, as illustrated in FIG. 10A, a status message for notification indicating that a calibration is required in the full-time display area 1001 of the screen displayed on the display 307. The screen displayed on the display 307 is divided into a function display area 1002 and the full-time display area 1001. For example, as illustrated in FIG. 10B, the user can constantly recognize the contents in the full-time display area 1001 even when the function display area 1002 shifts to a copy setting screen. After executing the processing in step S507, the processing returns to step S506, and the CPU 201 repeats the processing in steps S506 and S507 until the calibration-required flag 601 becomes "No".

As described above, when the drum unit 518 is replaced with a new one, the CPU 201 can display the guide screen 700 for providing the notification indicating that a calibration is required and accepting a calibration execution instruction to prompt the user to execute a calibration. In a case where the calibration is not performed at that timing, then the CPU 201 notifies the user that a calibration is required in the full-time display area 1001 on the screen displayed on the display 307. In this way, it is possible to notify the user that a calibration is required at an appropriate timing.

Figure 11:
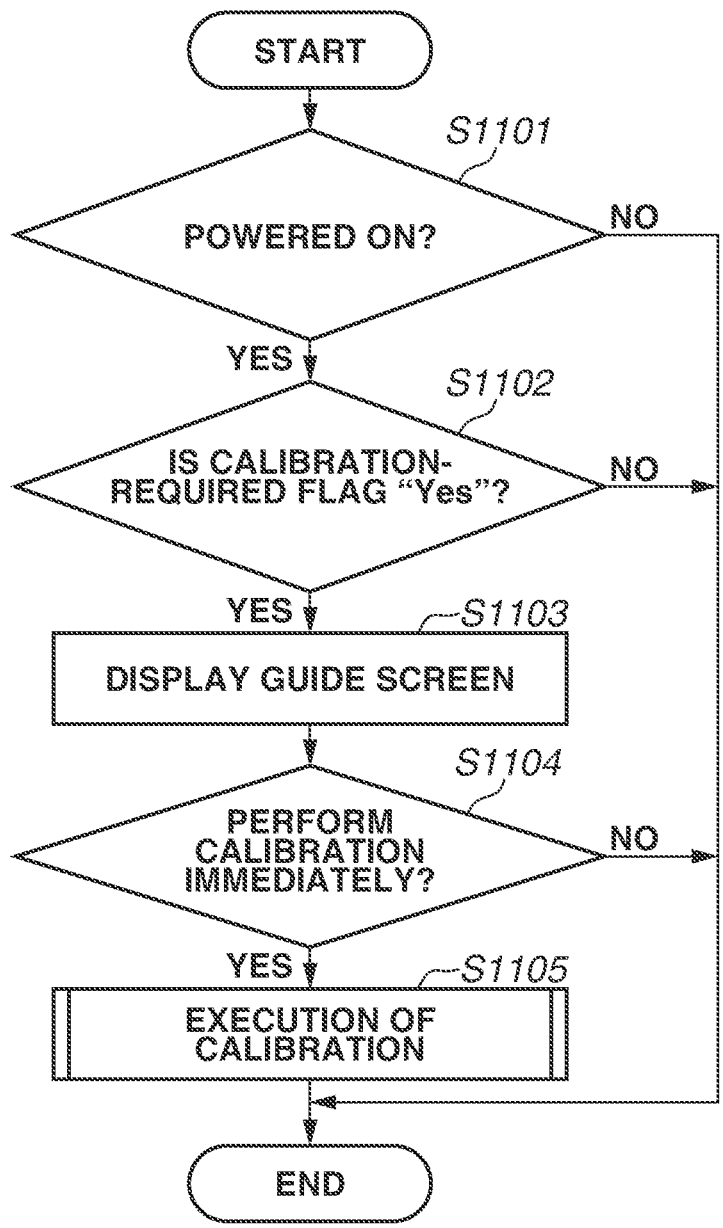
FIG. 11 is a flowchart illustrating processing performed by an image forming apparatus according to an exemplary embodiment.

FIG. 11 is a flowchart illustrating processing performed by the image forming apparatus 1. The flowchart in FIG. 11 is implemented by the CPU 201 executing a program stored in the ROM 202 or the HDD 204.

In step S1101, the CPU 201 determines whether the image forming apparatus 1 is powered on. The CPU 201 determines whether the image forming apparatus 1 is powered on based on, for example, whether power is supplied from the image forming apparatus 1 to the CPU 201. In a case where the CPU 201 determines that the image forming apparatus 1 is powered on (YES in step S1101), the processing proceeds to step S1102. In a case where the CPU 201 determines that the image forming apparatus 1 is not powered on (NO in step S1101), the CPU 201 exits the present flowchart.

In step S1102, the CPU 201 determines whether the value of the calibration-required flag 601 is "Yes". In a case where the value of the calibration-required flag 601 is "Yes" (YES in step S1102), the processing proceeds to step S1103. In a case where the value of the calibration-required flag 601 is "No" (NO in step S1102), the CPU 201 exits the present flowchart.

In step S1103, as illustrated in FIG. 7, the CPU 201 displays on the display 307 the guide screen 700 for prompting the user to perform calibration. As described above, the CPU 201 prompts the user to perform calibration in response to the powered-on of the image forming apparatus 1, as a trigger.

In step S1104, the CPU 201 determines whether the calibration is to be performed immediately by accepting the input of the "Yes" button 701 or the "No" button 702 on the guide screen 700. In a case where the "Yes" button 701 is pressed (YES in step S1104), the processing proceeds to step S1105. In a case where the "No" button 702 is pressed (NO in step S1104), the CPU 201 exits the present flowchart.

In step S1105, the CPU 201 executes the calibration execution sub-process. The details of the calibration execution sub-process performed in step S1105 are as described with reference to FIGS. 8, 9A, 9B, and 9C.

In addition, not illustrated in FIG. 11, similar to the flowchart in FIG. 5, the processing in steps S506 and S507 may be performed after the calibration execution sub-process performed in step S1105. In the case where the "No" button 702 is pressed in step S1104 (YES in step S1104), since it is known that the calibration-required flag 601 is "Yes" in step S1102, the processing may proceed to step S507.

As described above, when the image forming apparatus 1 is powered on, the CPU 201 can display the guide screen 700 for providing the notification indicating that a calibration is required and accepting a calibration execution instruction. In this way, it is possible to notify the user that a calibration is required at an appropriate timing.

Next, with reference to FIG. 12, a processing example of a case where a plurality of drum units need to be replaced will be described.

Figure 12:
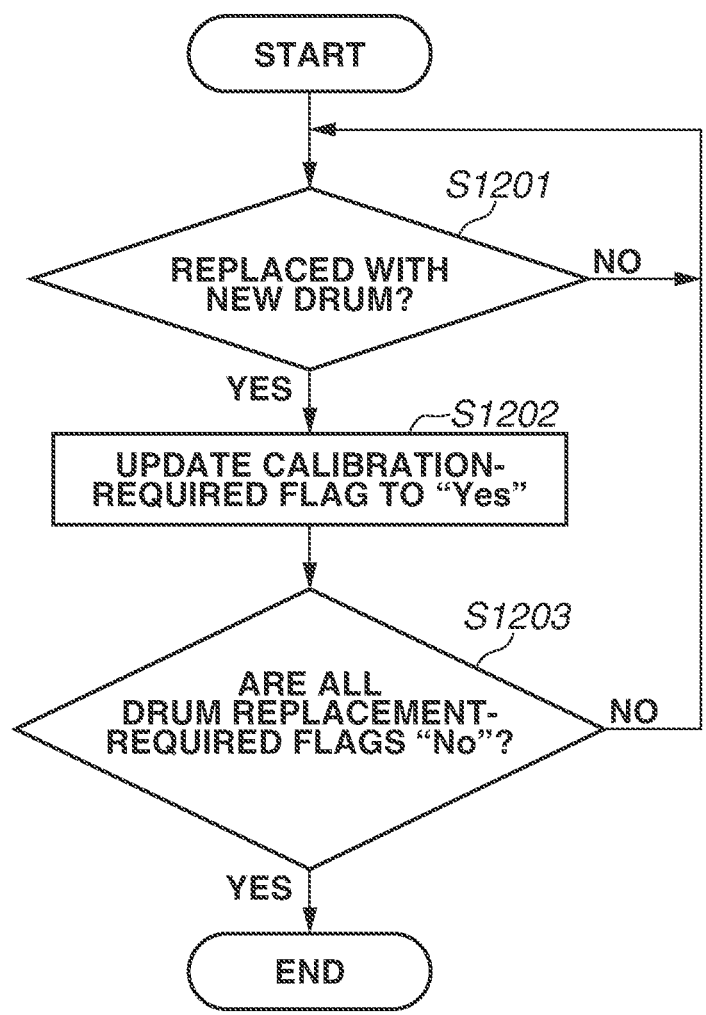
FIG. 12 is a flowchart illustrating processing performed by an image forming apparatus according to an exemplary embodiment.

Instead of steps S501 and S502 in the flowchart of FIG. 5, a flowchart in FIG. 12 may be executed.

As described above, the CPU 201 can determine whether the replacement of the drum unit 518 is required by storing the mount or the replacement detection date and time of the drum unit 518 in the RAM 203 and adding the printable period read from the memory electrode 121. The CPU 201 determines whether the replacement of the drum unit 518 is required, for each of the drum unit 518Y, the drum unit 518M, the drum unit 518C, and the drum unit 518K for respective colors. Further, as illustrated in FIGS. 13A, 13B, 13C, and 13D, drum replacement-required flags 1301 to 1304 each indicating whether the replacement of the corresponding drum unit 518 is required are managed together with the calibration-required flag 601 in the flag management table 600 stored in the ROM 202 or the HDD 204. The drum replacement-required flags correspond to replacement information in the present exemplary embodiment. The drum replacement-required flags 1301 to 1304 are drum replacement-required flags of the drum unit 518Y, the drum unit 518M, the drum unit 518C, and the drum unit 518K, respectively.

In step S1201, the CPU 201 determines whether the drum unit 518 has been replaced with a new one. In step S1201, in a case where the CPU 201 determines that the drum unit 518 has been replaced with a new one (YES in step S1201), the processing proceeds to step S1202.

In step S1202, the CPU 201 updates a value of a calibration-required flag 601 to "Yes".

In step S1203, the CPU 201 determines whether the values of the drum replacement-required flags 1301 to 1304 do not include "Yes" (required), i.e., all the values of the drum replacement-required flags 1301 to 1304 for respective colors are "No" (not required). In a case where the CPU 201 determines that all the values of the drum replacement-required flags 1301 to 1304 for respective colors are "No" (YES in step S1203), the CPU 201 exits the present flowchart to shift to step S503 in the flowchart of FIG. 5. In a case where the CPU 201 determines that the values of the drum replacement-required flags 1301 to 1304 includes "Yes" (NO in step S1203), the processing returns to step S1201.

For example, in FIG. 13A, the drum replacement-required flag 1301 is "Yes", and the drum unit 518C needs to be replaced. In step S1201, in a case where the CPU 201 determines that the drum unit 518C has been replaced with a new one (YES in step S1201), the state of the flags shifts from the state in FIG. 13A to the state in FIG. 13B, via the processing in step S1202. In FIG. 13B, since all the drum replacement-required flags 1301 to 1304 for respective colors are "No", the processing proceeds from step S1203 to step S503 in the flowchart of FIG. 5.

Further, in FIG. 13C, the drum replacement-required flags 1301 and 1302 are "Yes", and thus the drum units 518C and 518M need to be replaced. In step S1201, in a case where the CPU 201 determines that the drum unit 518C has been replaced with a new one (YES in step S1201), the state of the flags shifts from the state in FIG. 13A to the state in FIG. 13D, via the processing in step S1202. In FIG. 13D, not all the drum replacement-required flags 1301 to 1304 for respective colors are "No", and since the drum unit 518M needs to be replaced with a new one, the processing returns from step S1203 to step S1201 to wait.

As described above, when all the values of the drum replacement-required flags 1301 to 1304 for respective colors are "No", and after all the drum units 518 required to be replaced are replaced, the guide screen 700 can be displayed.

While the present disclosure has been described using the exemplary embodiments, all the above-described exemplary embodiments are merely examples of the present disclosure and shall not be construed as limiting the technical range of the present disclosure. The present disclosure can be realized in diverse ways so long as it is in accordance with the technological thought or main features of the present disclosure.

In the present exemplary embodiment, the information processing apparatus to which the present disclosure is applied is described as an apparatus integrated with the image forming apparatus 1. However, the information processing apparatus to which the present disclosure is applied may be configured to be an apparatus separate from the image forming apparatus 1.

Other Exemplary Embodiment

The present disclosure can be realized by processing of supplying a program for implementing one or more functions of the above-described exemplary embodiments to a system or an apparatus via a network or a storage medium and one or more processors in the system or the apparatus reading and executing the program. Further, the present disclosure can also be realized by a circuit (e.g., application specific integrated circuits (ASIC)) that can implement one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-176372, filed Oct. 28, 2021, which is hereby incorporated by reference herein in its entirety.

What is claimed is:

1. An information processing apparatus comprising:
one or more processors;
one or more memories including instructions stored thereon that, when executed by the one or more processors, cause the information processing apparatus to function as:
an obtaining unit configured to obtain information about a drum unit configured to form an image on a sheet; and
a display control unit configured to display a screen including information about execution of a calibration process on a display, in a case where the drum unit has been replaced with a new one,
wherein, in a case where a first screen including the information about execution of the calibration process and displayed by the display control unit receives an instruction indicating that the calibration process is not to be executed the display control unit displays the information about execution of the calibration process on a second screen different from the first screen,
wherein the second screen is a screen on which a plurality of functions of the information processing apparatus at least including a copy function is selectable, and
wherein, even in a case where the display control unit displays a third screen different from the second screen, the display control unit displays the information about execution of the calibration process on the third screen.

2. The information processing apparatus according to claim 1, further comprising a management unit configured to store calibration information, indicating whether the calibration is required, in a storage medium to manage the calibration information, and configured to update the calibration information to "required" in the case where it is detected that the drum unit has been replaced with a new one based on the information obtained by the obtaining unit.

3. The information processing apparatus according to claim 2, wherein, in a case where the calibration information managed by the management unit indicates "required", the display control unit displays the information about execution of the calibration process in a full-time display area in the second screen displayed on the display.

4. The information processing apparatus according to claim 2,
wherein the display control unit displays the first screen, in a case where it is determined that the drum unit has been replaced with a new one, and
wherein the management unit updates the calibration information to "not required" in a case where an instruction indication that the calibration process is to be executed via the first screen and the calibration process has been executed.

5. The information processing apparatus according to claim 2,
wherein the display control unit displays the first screen on the display, in a case where the calibration information managed by the management unit indicates "required" when the image forming apparatus is powered on, and
wherein the management unit updates the calibration information to "not required" in a case where an instruction indication that the calibration process is to be executed via the first screen and the calibration process has been executed.

6. The information processing apparatus according to claim 2,
wherein the management unit stores in the storage medium replacement information indicating whether a replacement of the drum unit is required for each color and manages the replacement information, and
wherein the display control unit displays the first screen in the case where it is determined that the drum unit has been replaced with a new one and when all of the replacement information indicates "not required".

7. The information processing apparatus according to claim 1, wherein the display control unit displays the information about execution of the calibration process in a full-time display area in the second screen displayed on the display.

8. The information processing apparatus according to claim 1, wherein, in a case where an instruction indicating that the calibration process is to be executed is received via the screen including the information about execution of the calibration process, the calibration process is executed.

9. The information processing apparatus according to claim 1, wherein, in a case where an instruction indicating that the calibration process is to be executed is received via the screen including the information about execution of the calibration process, the display control unit displays a screen for executing the calibration process, and the calibration process is executed.

10. The information processing apparatus according to claim 1, wherein the information about execution of the calibration process, which is displayed on the first screen and the second screen, is information indicating that the calibration process is required.

11. The information processing apparatus according to claim 1, wherein the information about execution of the calibration process, which is displayed on the first screen and the second screen, is information for prompting execution of the calibration process.

12. The information processing apparatus according to claim 1, wherein the first screen is a screen that allows a user to select whether to execute the calibration process.

13. The information processing apparatus according to claim 1, wherein the second screen is a home screen for selecting a plurality of functions of the information processing apparatus at least including the copy function.

14. The information processing apparatus according to claim 1, wherein the third screen is a setting screen on which a setting regarding the copy function of the information processing apparatus is settable.

15. The information processing apparatus according to claim 1, further comprising a determination unit configured to determine, based on the information obtained, whether the drum unit has been replaced with a new one,
wherein, in a case where the first screen including the information about execution of the calibration process is displayed by the display control unit and an instruction is received indicating that the calibration process is not to be executed, the determination unit determines whether the calibration process has been completed and whether the calibration process has been executed, and
wherein, in a case where it is determined that the calibration process has not been completed or the calibration process has not been executed, the display control unit displays the information about execution of the calibration process on the second screen different from the first screen.

16. An information processing method comprising:
obtaining information about a drum unit configured to form an image on a sheet; and
displaying a screen including information about execution of a calibration process on a display, in a case where the drum unit has been replaced with a new one,
wherein, in a case where a first screen including the information about execution of the calibration process and displayed by the display control unit receives an instruction indicating that the calibration process is not to be executed, the display control unit displays the information about execution of the calibration process on a second screen different from the first screen,
wherein the second screen is a screen on which a plurality of functions of the information processing apparatus at least including a copy function is selectable, and
wherein, even in a case where the display control unit displays a third screen different from the second screen, the display control unit displays the information about execution of the calibration process on the third screen.

17. A non-transitory computer-readable storage medium storing a program for causing a computer to perform an information processing method, the information processing method comprising:
obtaining information about a drum unit configured to form an image on a sheet; and
displaying a screen including information about execution of a calibration process on a display, in a case where the drum unit has been replaced with a new one,
wherein, in a case where a first screen including the information about execution of the calibration process and displayed by the display control unit receives an instruction indicating that the calibration process is not to be executed, the display control unit displays the information about execution of the calibration process on a second screen different from the first screen, wherein the second screen is a screen on which a plurality of functions of the information processing apparatus at least including a copy function is selectable, and wherein, even in a case where the display control unit displays a third screen different from the second screen, the display control unit displays the information about execution of the calibration process on the third screen.

\* \* \* \* \*